US00RE46913E

(19) United States
(12) Reissued Patent
Jackson et al.

(10) Patent Number: US RE46,913 E
(45) **Date of Reissued Patent: *Jun. 26, 2018**

(54) OPTICAL BRIGHTENING COMPOSITIONS

(71) Applicant: ARCHROMA IP GMBH, Reinach (CH)

(72) Inventors: Andrew Clive Jackson, Muenchenstein (CH); David Puddiphatt, Grellingen (CH); Cédric Klein, Brumath (FR)

(73) Assignee: ARCHROMA IP GMBH, Reinach (CH)

( * ) Notice: This patent is subject to a terminal disclaimer.

(21) Appl. No.: 15/477,788

(22) Filed: Apr. 3, 2017

Related U.S. Patent Documents

Reissue of:

(64) Patent No.: 8,821,688
Issued: Sep. 2, 2014
Appl. No.: 12/934,170
PCT Filed: Mar. 12, 2009
PCT No.: PCT/EP2009/052919
§ 371 (c)(1),
(2) Date: Mar. 7, 2011
PCT Pub. No.: WO2009/118247
PCT Pub. Date: Oct. 1, 2009

(30) Foreign Application Priority Data

Mar. 26, 2008 (EP) ..... 08102906
Dec. 10, 2008 (EP) ..... 08171223
Dec. 12, 2008 (CH) ..... 08171480

(51) Int. Cl.
*D21H 21/30* (2006.01)
*C07D 251/68* (2006.01)
*D21H 17/66* (2006.01)
*D21H 17/63* (2006.01)
*D21H 21/16* (2006.01)

(52) U.S. Cl.
CPC ..... *D21H 17/63* (2013.01); *D21H 17/66* (2013.01); *D21H 21/16* (2013.01); *D21H 21/30* (2013.01)

(58) Field of Classification Search
CPC ..... D21H 17/63
USPC ..... 162/162
See application file for complete search history.

(56) References Cited

U.S. PATENT DOCUMENTS 3,479,349 A * 11/1969 Corwin et al. ..... 544/83
3,532,692 A 10/1970 Heinrich et al.
3,728,275 A 4/1973 Ciba Geigy Corp
4,025,507 A * 5/1977 Fleck et al. ..... 544/193.2
4,466,900 A * 8/1984 Horlacher et al. ..... D06L 4/664 252/301.21
4,764,176 A 8/1988 Sakamoto
5,873,913 A * 2/1999 Cowman et al. .... C07D 251/68 162/162
6,153,122 A * 11/2000 Rohringer et al. ..... 252/301.23
6,890,454 B2 5/2005 Farrar et al. ..... C09B 23/148 162/135
7,060,201 B2 6/2006 Farrar
7,198,731 B2 4/2007 Jackson
7,812,156 B2 10/2010 Jackson et al.
8,845,861 B2 * 9/2014 Jackson ..... D21H 17/63 106/206.1
2007/0186358 A1 8/2007 Jackson
2007/0245503 A1 10/2007 Jackson et al.
2007/0277950 A1 * 12/2007 Skaggs et al. ..... 162/162
2008/0066878 A1 * 3/2008 Nguyen ..... 162/24
2011/0146929 A1 6/2011 Jackson et al.

FOREIGN PATENT DOCUMENTS

CA 2553556 10/2005
CA 2553556 A1 10/2005
DE 1811715 A1 6/1970
DE 2715864 A1 10/1977
EP 0 032 483 A2 7/1981
EP 0899373 A1 3/1999
EP 1763519 3/2007
EP 1763519 A1 3/2007
GB 760982 A 11/1956
GB 773152 A 4/1957
GB 976822 A 12/1964
GB 1140415 1/1969
GB 1140415 A 1/1969
GB 1174631 A 12/1969
GB 1239818 7/1971

(Continued)

OTHER PUBLICATIONS

PCT International Search Report for PCT/EP2009/052919, dated Jul. 27, 2009.

(Continued)

*Primary Examiner* — Timothy J. Kugel
(74) *Attorney, Agent, or Firm* — McBee Moore Woodward & Vanik IP, LLC

(57) ABSTRACT

The instant invention relates to mixed salts of optical brighteners of formula (1), (1)

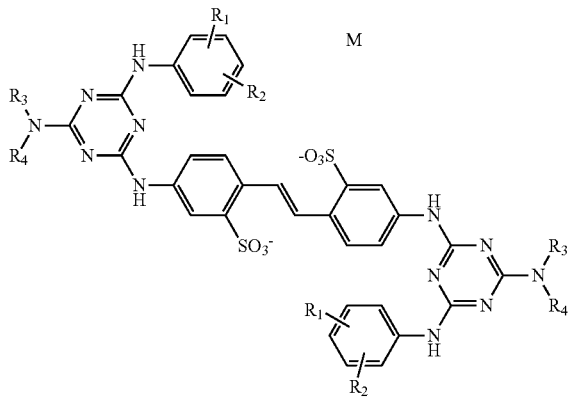

wherein M represents a mixture of $Mg^{2+}$ with another cation, which provide for superior optical brightening effects when applied to the surface of paper.

18 Claims, No Drawings

(56) References Cited

FOREIGN PATENT DOCUMENTS

| | | | |
|---|---|---|---|
| GB | 1239818 | A | 7/1971 |
| GB | 1240020 | A | 7/1971 |
| GB | 1293804 | A | 10/1972 |
| GB | 1526004 | | 9/1978 |
| GB | 1526004 | A | 9/1978 |
| JP | 5-56104970 | A | 8/1981 |
| JP | S-56104970 | A | 8/1981 |
| JP | S58-222156 | A | 12/1983 |
| JP | 62106965 | | 5/1987 |
| JP | S62-106965 | A | 5/1987 |
| JP | 2011515597 | A | 5/2011 |
| WO | 96/00220 | A1 | 1/1996 |
| WO | 9600221 | A1 | 1/1996 |
| WO | WO 96/00221 | | 1/1996 |
| WO | 9842685 | A1 | 10/1998 |
| WO | WO 98/42685 | | 10/1998 |
| WO | 03044275 | A1 | 5/2003 |
| WO | WO 03/044275 | | 5/2003 |
| WO | 2007/048720 | A1 | 5/2007 |
| WO | 2009118247 | A1 | 10/2009 |

OTHER PUBLICATIONS

Clariant, Fiche de donnèes de sécuritéconforme au Règlement (CE) N° 1907/2006, Leucophor AF liq (Safety Sheet for Leuocophor AF liq), Jan. 8, 2009.

Klaus Hunger (Editor), Industrial Dyes: Chemistry, Properties, Applications (2003), pp. 593-596, Wiley-VCH, Germany.

Martinez, et al., "Effect of optical brighteners on the insecticidal activity of a nucleopolyhedrovirus in three instars of Spodoptera frugiperda," (2003) The Netherlands Entomological Society, Entomologia Experimentalis et Applicata, vol. 109: 139-146.

PCT International Search Report for PCT/EP2009/052919, mailed Jul. 24, 2009.

English Abstract for JP 62106965, May 18, 1987.

"Water to Zirconium, and Zirconium, Compounds," Ullmann's Encyclopedia of Industrial Chemistry, Sixth Edition, vol. 39, 2003.

* cited by examiner

OPTICAL BRIGHTENING COMPOSITIONS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

The instant invention relates to mixed salts of optical brighteners comprising $Mg^{2+}$ which provide superior optical brightening effects when applied to the surface of paper.

BACKGROUND

A high level of whiteness is an important parameter for the end-user of paper products. The most important raw materials of the papermaking industry are cellulose, pulp and lignin which naturally absorb blue light and therefore are yellowish in color and impart a dull appearance to the paper. Optical brighteners are used in the papermaking industry to compensate for the absorption of blue light by absorbing UV-light with a maximum wavelength of 350-360 nm and converting it into visible blue light with a maximum wavelength of 440 nm.

In the manufacture of paper, optical brighteners may be added either at the wet end of the paper machine, or to the surface of paper, or at both points. In general, it is not possible to achieve the whiteness levels required of higher-quality papers by addition at the wet end alone.

A common method of adding optical brightener to the surface of paper is by application of an aqueous solution of the optical brightener at the size-press together with a sizing agent, typically a native starch or an enzymatically or chemically modified starch. A preformed sheet of paper is passed through a two-roll nip, the entering nip being flooded with sizing solution. The paper absorbs some of the solution, the remainder being removed in the nip.

In addition to starch and optical brightener, the sizing solution can contain other chemicals designed to provide specific properties. These include defoamers, wax emulsions, dyes, pigments and inorganic salts.

In order to reach higher whiteness levels, considerable effort has been put into the development of new optical brighteners. See, for example, Japanese Kokai 62-106965, PCT Application WO 98/42685, U.S. Pat. No. 5,873,913 and European Patent 1,763,519.

GB 1 239 818 discloses hexasulphonated optical brighteners derived from triazinylaminostilbenes. Examples 1 to 6 disclose their sodium salts. Magnesium is only mentioned in a list of possible counterions for the hexasulphonated optical brighteners, starch as a component in a surface sizing composition is also only mentioned in a list of possible binding agents.

The demand remains for more efficient means of achieving high whiteness levels in paper.

DESCRIPTION OF THE INVENTION

Surprisingly, we have found that optical brighteners of formula (1) when applied to the surface of paper, optionally in combination with magnesium salts, in a starch sizing composition give enhanced whitening effects.

Subject of the invention is a compound of formula (1), (1)

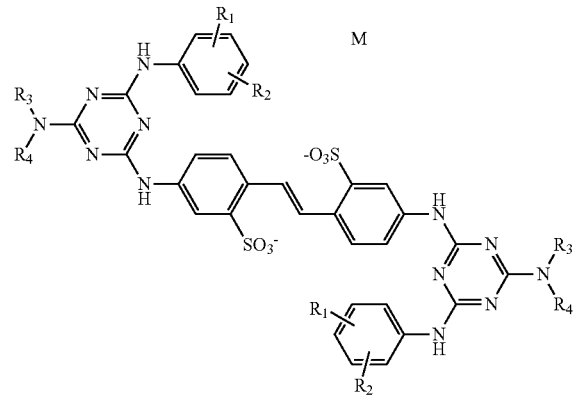

wherein $R_1$ is hydrogen or $SO_3^-$, $R_2$ is hydrogen or $SO_3^-$, $R_3$ is hydrogen, $C_{1-4}$ alkyl, $C_{2-3}$ hydroxyalkyl, $CH_2CO_2^-$, $CH_2CH_2CONH_2$ or $CH_2CH_2CN$, $R_4$ is $C_{1-4}$ alkyl, $C_{2-3}$ hydroxyalkyl, $CH_2CO_2^-$, $CH(CO_2^-)CH_2CO_2^-$ or $CH(CO_2^-)CH_2CH_2CO_2^-$, benzyl, or $R_3$ and $R_4$ together with the neighbouring nitrogen atom signify a morpholine ring, and wherein M represents the required stoichiometric cationic equivalent for balancing the anionic charge in formula (1) and is a combination of $Mg^{2+}$ together with at least 1, preferably 1, 2, 3, 4, 5 or 6, more preferably 1, 2 or 3, even more preferably 1 or 2, further cations, the further cations being selected from the group consisting of $H^+$, alkali metal cation, alkaline earth metal cation other than $Mg^{2+}$, ammonium, mono-$C_1$-$C_4$-alkyl-di-$C_2$-$C_3$-hydroxyalkyl ammonium, di-$C_1$-$C_4$-alkyl-mono-$C_2$-$C_3$-hydroxyalkyl ammonium, ammonium which is mono-, di- or trisubstituted by a $C_2$-$C_3$ hydroxyalkyl radical and mixtures thereof.

The molar ratio of the $Mg^{2+}$ to the further cation in M is preferably of from between 0.01 to 99.99 and 99.99 to 0.01, more preferably of from 20 to 80 and 99.99 to 0.01, even more preferably of from 50 to 50 and 99.99 to 0.01.

An alkali metal cation is preferably $Li^+$, $Na^+$ or $K^+$.

An alkaline earth metal cation other than $Mg^{2+}$ is preferably $Ca^{2+}$.

Preferably, the further cation in M is selected from the group consisting of $H^+$, $Li^+$, $Na^+$, $K^+$, $Ca^{2+}$, N-methyl-N,N-diethanolammonium, N,N-dimethyl-N-ethanolammonium, tri-ethanolammonium, tri-isopropanolammonium and mixtures thereof.

Preferred compounds of formula (1) are those wherein $R_3$ represents hydrogen, methyl, ethyl, n-propyl, iso-propyl, β-hydroxyethyl, β-hydroxypropyl, $CH_2CO_2^-$, $CH_2CH_2CONH_2$ or $CH_2CH_2CN$ and $R_4$ represents methyl, ethyl, n-propyl, isopropyl, 2-butyl, β-hydroxyethyl, β-hydroxypropyl, $CH_2CO_2^-$, $CH(CO_2^-)CH_2CO_2^-$, $CH(CO_2^-)CH_2CH_2CO_2^-$ or benzyl.

Compounds of formula (2) and (3) with M having the definition as described above, also in all its preferred embodiments, are specific examples for the compounds of formula (1); compounds of formula (2) and (3) with M being a mixture of $Mg^{2+}$ with $Na^+$ and/or $K^+$ are further specific examples, but the invention is not limited to these specific examples.

(2)

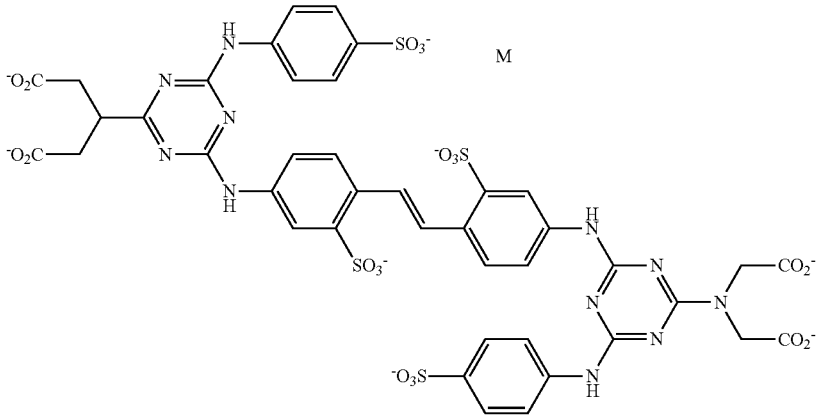

(3)

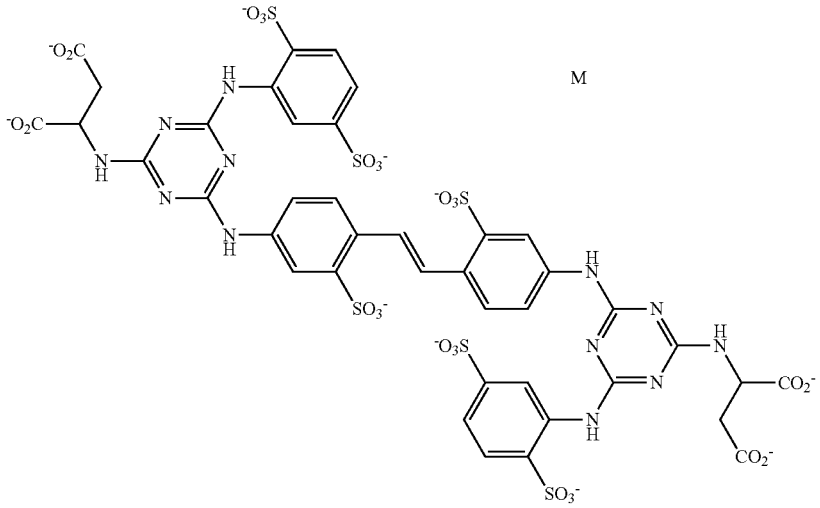

Further subject of the invention is a process for the preparation of a compound of formula (1), characterized by a reaction A, which is followed by a reaction B, which is followed by a reaction C, wherein in reaction A a compound of formula (10) is reacted with a compound of formula (11) to a compound of formula (12);

(11)

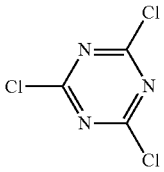

(10)

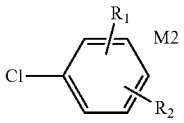

-continued (12)

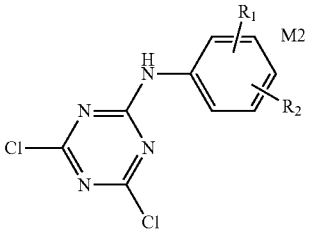

in reaction B a compound of formula (12) is reacted with a compound of formula (13) to a compound of formula (14);

(13)

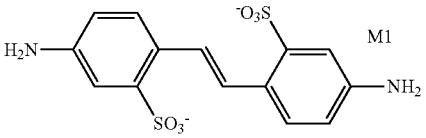

-continued (14)

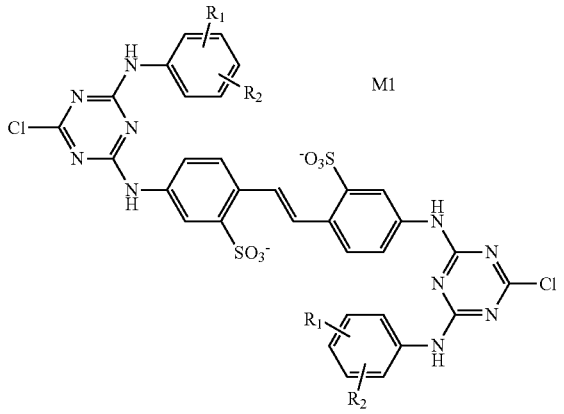

and in reaction C a compound of formula (14) is reacted with a compound of formula (15) to the compound of formula (1);

(15)

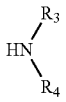

with $R_1$, $R_2$, $R_3$ and $R_4$ having the definition as described above, also in all their preferred embodiments, M1 is identical or different in formula (13) and (14) and represents the required stoichiometric cationic equivalent for balancing the anionic charge in these formulae and is at least 1 cation selected from the group consisting of $H^+$, alkali metal cation, alkaline earth metal cation other than magnesium, ammonium, mono-$C_1$-$C_4$-alkyl-di-$C_2$-$C_3$-hydroxyalkyl ammonium, di-$C_1Ca_4$-alkyl-mono-$C_2$-$C_3$-hydroxyalkyl ammonium, ammonium which is mono-, di- or trisubstituted by a $C_2$-$C_3$ hydroxyalkyl radical and mixtures thereof, M2 is independently from each other identical or different in formula (10) and (12) and represents the required stoichiometric cationic equivalent for balancing the anionic charge in these formulae in the case, that either $R_1$ or $R_2$ or both $R_1$ and $R_2$ are $SO_3^-$, and has the same definition as M1, with the proviso, that at least 1 of the reactions A, B or C is carried out in the presence of the cation CAT, with the cation CAT being $Mg^{2+}$.

The cation CAT may be introduced into the reaction A, B and/or C via M1 in formula (13) comprising $Mg^{2+}$ and/or M2 in formula (10) comprising $Mg^{2+}$, or by the addition of a magnesium salt MS1 as further component to the reaction A, B and/or C. The magnesium salt MS1 is preferably selected from the group consisting of magnesium acetate, magnesium bromide, magnesium chloride, magnesium formate, magnesium iodide, magnesium nitrate, magnesium sulphates, magnesium thiosulphate, magnesium hydroxide, magnesium carbonate, magnesium hydrogencarbonate and mixtures thereof; more preferably the magnesium salt MS1 is magnesium hydroxide, magnesium chloride, magnesium sulphate or magnesium thiosulphate. Even more preferably, the magnesium salt MS1 is magnesium hydroxide, magnesium chloride or magnesium thiosulfate.

1, 2 or all 3 reactions A, B and C can be carried out in the presence of a magnesium salt MS1.

Preferably, M1 and M2 independently from each other are selected from the group consisting of $H^+$, $Li^+$, $Na^+$, $K^+$, $Ca^{2+}$, $Mg^{2+}$, N-methyl-N,N-diethanolammonium, N,N-dimethyl-N-ethanolammonium, tri-ethanolammonium, tri-isopropanolammonium and mixtures thereof; more preferably M1 and M2 independently from each other are selected from the group consisting of $H^+$, $Na^+$, $K^+$ and $Mg^{2+}$; even more preferably, M1 and M2 independently from each other are selected from the group consisting of $Na^+$, $K^+$ and $Mg^{2+}$.

Each reaction A, B and C is preferably carried out in water or in a mixture of water and non-aqueous organic solvent. Preferably, the compound of formula (11) is suspended in water, or the compound of formula (11) is dissolved in a solvent.

A preferable solvent is acetone.

Preferably, compound of formula (11) is used as a suspension in water.

Each compound of formula (10), (13) and (15) may be used with or without dilution, in case of dilution the compounds of formula (10), (13) or (15) are preferably used in the form of an aqueous solution or suspension.

Preferably, the compound of formula (10) is reacted in 0 to 10 mol-% excess with respect to compound of formula (11). One mol equivalent of compound of formula (13) is reacted with two mol equivalents of compound of formula (12) preferably in 0 to 10 mol-% excess with respect to compound of formula (12). Two equivalents of compound of formula (15) are reacted with one mol equivalent of compound of formula (14), preferably compound of formula (15) is reacted in 0 to 30 mol-% excess with respect to compound of formula (14).

Preferably, any reaction A, B and C is done between atmospheric pressure and 10 bar, more preferably under atmospheric pressure.

In reaction A, the reaction temperature is preferably of from −10 to 20° C.

In reaction B, the reaction temperature is preferably of from 20 to 60° C.

In reaction C, the reaction temperature is preferably of from 60 to 102° C.

Reaction A is preferably carried out under acidic to neutral pH conditions, more preferably the pH is of from of 2 to 7.

Reaction B is preferably carried out under weakly acidic to weakly alkaline conditions, more preferably the pH is of from 4 to 8.

Reaction C is preferably carried out under weakly acidic to alkaline conditions, more preferably the pH is of from 5 to 11.

The pH of each reaction A, B and C is generally controlled by addition of a suitable base, the choice of base being dictated by the desired product composition. Preferred bases are selected from the group consisting of aliphatic tertiary amines and of hydroxides, carbonates and bicarbonates of alkali and/or alkaline earth metals and of mixtures thereof. Preferred alkali and alkaline earth metals are selected from the group consisting of lithium, sodium, potassium, calcium, magnesium. Preferred aliphatic tertiary amines are N-methyl-N,N-di-ethanolamine, N,N-dimethyl-N-ethanolamine, tri-ethanolamine and tri-isopropanolamine. Where a combination of two or more different bases is used, the bases may be added in any order, or at the same time. More preferably, for adjusting the pH, a basic magnesium salt is used.

Preferably, the basic magnesium salt is selected from the group consisting of magnesium hydroxide, magnesium carbonate, magnesium hydrogencarbonate and mixtures thereof; more preferably the basic magnesium salt is magnesium hydroxide.

Preferably, when a basic magnesium salt has been used to adjust the pH in one of the reactions A and/or B, then in the consecutive reactions B and C or in the consecutive reaction C respectively, the base to control the pH is also a basic magnesium salt, more preferably it is the same basic magnesium salt as used firstly in the reaction A and/or B.

Where it is necessary to adjust the reaction pH using acid, preferable acids are selected from the group consisting of hydrochloric acid, sulphuric acid, formic acid and acetic acid.

Solutions containing one or more compounds of general formula (1) may optionally be desalinated by membrane filtration.

The membrane filtration process is preferably that of ultrafiltration. Preferably, thin-film membranes are used. Preferably, the membrane is made of polysulphone, polyvinylidenefluoride or cellulose acetate.

Further subject of the invention is a process for the preparation of compound of formula (1), characterized by mixing a compound of formula (20) with a component b), which is a magnesium salt MS2, in aqueous medium;

(20)

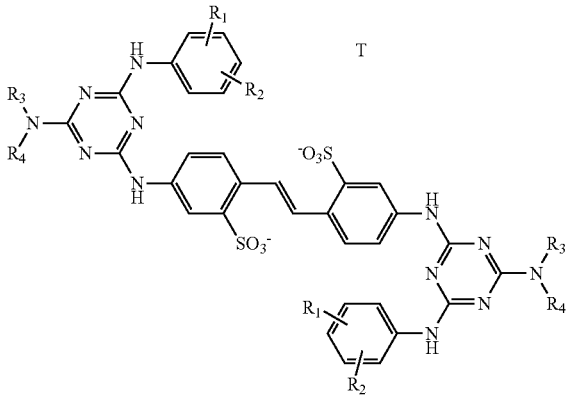

wherein $R_1$, $R_2$, $R_3$ and $R_4$ have the definition as described above, also in all their preferred embodiments;

and wherein

T balances the anionic charge and represents the required stoichiometric equivalent of a cation selected from the group consisting of $H^+$, alkali metal cation, ammonium, mono-$C_1$-$C_4$-alkyl-di-$C_2$-$C_3$-hydroxyalkyl ammonium, di-$C_1$-$C_4$-alkyl-mono-$C_2$-$C_3$-hydroxyalkyl ammonium, ammonium which is mono-, di- or trisubstituted by a $C_2$-$C_3$ hydroxyalkyl radical and mixtures thereof.

Preferably, the mixing is done in aqueous solution.

Preferably,

T balances the anionic charge and is a cation selected from the group consisting of $H^+$, $Na^+$, $K^+$, ammonium, N-methyl-N,N-di-ethanolammonium, N,N-dimethyl-N-ethanolammonium, tri-ethanolammonium, tri-isopropanolammonium and mixtures thereof.

Compounds of formula (21) and (22) are specific examples for the compounds of formula (20), but the invention is not limited to these specific examples.

(21)

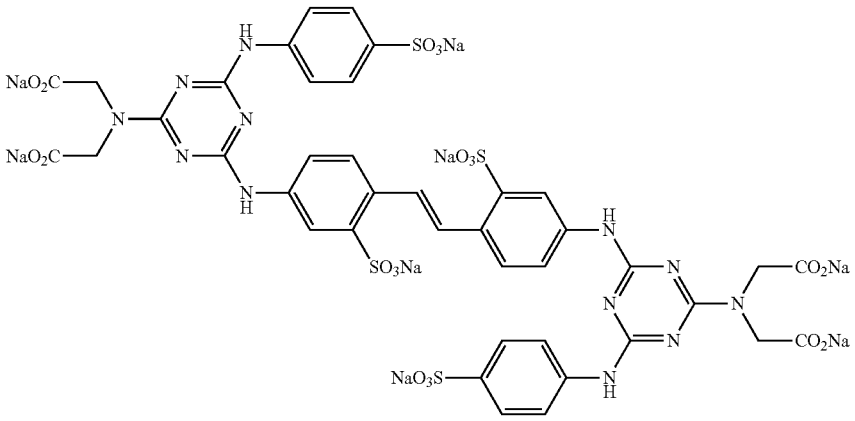

-continued (22)

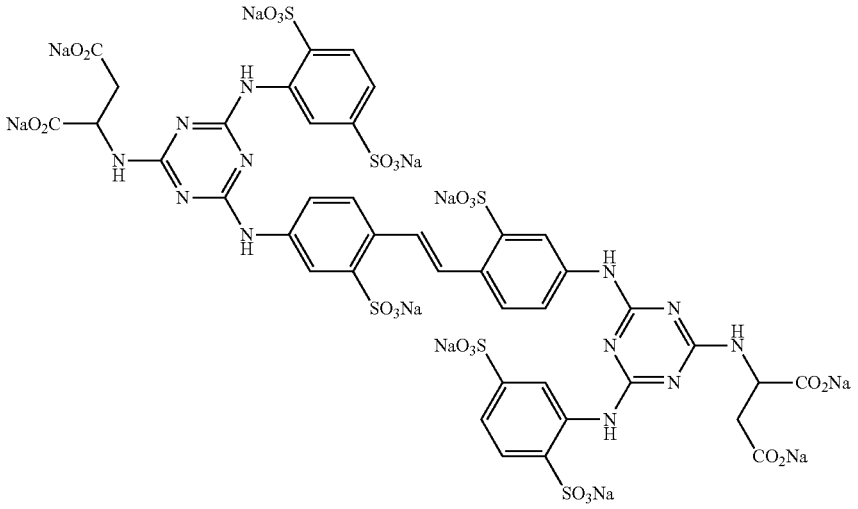

The magnesium salt MS2 is selected from the group consisting of magnesium acetate, magnesium bromide, magnesium chloride, magnesium formate, magnesium iodide, magnesium nitrate, magnesium sulphate and magnesium thiosulphate. Preferably, the magnesium salt is magnesium chloride, magnesium sulphate or magnesium thiosulphate. Even more preferably, the magnesium salt is magnesium chloride or magnesium thiosulphate.

Preferably, mixing temperature is of from 0 to 100° C.

Preferably, the mixing is done at atmospheric pressure.

Preferably, the mixing time is of from 5 second to 24 hours.

Preferably, in addition to water further organic solvents may be present, more preferably, the organic solvents are selected from the group consisting of $C_1$-$C_4$ alcohols and acetone.

Preferably, compound of formula (20) is used in a concentration of from 0.01 g/l to 20 g/l for the mixing.

Preferably, 0.1 to 50, more preferably 0.1 to 45, even more preferably 0.1 to 40, especially 0.1 to 15, more especially 0.15 to 10 parts of component (b) are present in the aqueous medium per part of component of formula (20).

Further subject of the invention is the use of a compound of formula (20) for the preparation of a compound of formula (1).

Further subject of the invention is the use of the compound of formula (1) in sizing compositions for brightening paper, preferably in the size-press.

Preferably, the sizing composition is an aqueous composition.

For the treatment of paper in the size-press, sizing compositions containing 0.2 to 30, preferably 1 to 15 grams per liter of the compound of formula (1), may be used.

The sizing composition also contains one or more binding agents, preferably 1, 2, 3, 4 or 5 binding agents, more preferably 1, 2 or 3, even more preferably 1 or 2 binding agents.

The sizing composition contains the binding agent preferably in a concentration of preferably 2 to 15% by weight, based on the total weight of the sizing composition. The pH is typically in the range 5-9, preferably 6-8.

The binding agent is preferably selected from the group consisting of starch, gelatin, alkali metal alginates, casein, hide glue, protein, cellulose derivatives, for example hydroxyethylcellulose or carboxymethylcellulose, polyvinylalcohol, polyvinylidenechloride, polyvinylpyrrolidone, polyethylene oxide, polyacrylates, saponified copolymer of vinylacetate and maleic anhydride and mixtures thereof.

More preferably, the binding agent is starch, polyvinylalcohol, carbomethylcellulose or mixtures thereof.

The binding agent or size is even more preferably starch. More preferably, the starch is selected from the group consisting of native starch, enzymatically modified starch and chemically modified starch. Modified starches are preferably oxidized starch, hydroxyethylated starch or acetylated starch. The native starch is preferably an anionic starch, an cationic starch, or an amphoteric starch. While the starch source may be any, preferably the starch sources are corn, wheat, potato, rice, maize, tapioca or sago. Polyvinyl alcohol and/or carboxymethylcellulose are preferably used as secondary binding agent.

In addition to the compound of formula (1), the binding agent and usually water, the sizing composition may comprise by-products formed during the preparation of the compound of formula (1) as well as other conventional paper additives. Examples of such paper additives are antifreezes, biocides, defoamers, wax emulsions, dyes, inorganic salts, solubilizing aids, preservatives, complexing agents, thickeners, surface sizing agents, cross-linkers, pigments, special resins etc. and mixtures thereof.

Further subject of the invention is a process for the optical brightening of paper comprising the steps of a) applying a sizing composition comprising the compound of formula (1) to the paper, b) drying the treated paper.

Preferably, a defoamer, a wax emulsion, a dye and/or a pigment is added to the sizing composition.

EXAMPLES

The cation content was determined by capillary electrophoresis.

The following examples shall explain the instant invention in more details without limiting the claimed scope. If not indicated otherwise, "%" and "parts" are meant by weight.

Example 1

Sizing compositions are prepared by adding an optical brightener of formula (21) in such an amount, that a range of final concentrations of from 2.5 to 12.5 g/l of optical brightener is achieved, to a stirred, aqueous solution of magnesium chloride (final concentration is 8 g/l) and an anionic oxidized potato starch (Perfectamyl A4692 from AVEBE B.A.) (final concentration is 50 g/l) at 60° C.

The sizing solution is allowed to cool, then poured between the moving rollers of a laboratory size-press and applied to a commercial 75 g/m$^2$ AKD (alkyl ketene dimer) sized, bleached paper base sheet. The treated paper is dried for 5 minutes at 70° C. in a flat bed drier. The dried paper is allowed to condition, then measured for CIE whiteness on a calibrated Elrepho spectrophotometer.

The Example is repeated both in the absence of magnesium chloride, i.e. only the sodium salt of the optical brightener is present, and with the magnesium chloride replaced by an equivalent amount of calcium chloride.

The results are summarized in Table 1, and clearly demonstrate the advantage of using magnesium chloride over the use of calcium chloride and over the use only of the sodium salt of the optical brightener in order to reach higher whiteness levels. The surprising nature of the invention is further illustrated by the observation that chloride salts of other divalent Group II metal ions, such as calcium chloride, even have a negative impact on the whitening effect of the optical brightener.

TABLE 1

| Compound of formula (21) (g/l) | Magnesium Chloride (g/l) | Calcium Chloride (g/l) | CIE Whiteness |
|---|---|---|---|
| 0 | 0 | 0 | 104.6 |
| 0 | 8 | 0 | 104.7 |
| 0 | 0 | 8 | 104.8 |
| 2.5 | 0 | 0 | 122.3 |
| 2.5 | 8 | 0 | 126.7 |
| 2.5 | 0 | 8 | 123.4 |
| 5.0 | 0 | 0 | 128.3 |
| 5.0 | 8 | 0 | 133.1 |
| 5.0 | 0 | 8 | 128.0 |
| 7.5 | 0 | 0 | 129.8 |
| 7.5 | 8 | 0 | 133.7 |
| 7.5 | 0 | 8 | 128.6 |
| 10.0 | 0 | 0 | 131.1 |
| 10.0 | 8 | 0 | 134.5 |
| 10.0 | 0 | 8 | 128.2 |
| 12.5 | 0 | 0 | 130.6 |
| 12.5 | 8 | 0 | 134.2 |
| 12.5 | 0 | 8 | 127.3 |

Example 2

Sizing solutions are prepared by adding an optical brightener of formula (22) in such an amount, that a range of final concentrations of from 2.0 to 10.0 g/l of optical brightener is achieved, to a stirred, aqueous solution of magnesium chloride (final concentration is 8 g/l) and an anionic oxidized potato starch (Perfectamyl A4692 from AVEBE B.A.) (final concentration 50 g/l) at 60° C.

The sizing solution is allowed to cool, then poured between the moving rollers of a laboratory size-press and applied to a commercial 75 g/m$^2$ AKD (alkyl ketene dimer) sized, bleached paper base sheet. The treated paper is dried for 5 minutes at 70° C. in a flat bed drier. The dried paper is allowed to condition, then measured for CIE whiteness on a calibrated Elrepho spectrophotometer.

The Example is repeated both in the absence of magnesium chloride, and with the magnesium chloride replaced by an equivalent amount of calcium chloride.

The results are summarized in Table 2, and clearly demonstrate the advantage of using magnesium chloride to reach higher whiteness levels in comparison to where the optical brightener is present only as the sodium salt.

TABLE 2

| Compound of formula (22) (g/l) | Magnesium Chloride (g/l) | Calcium Chloride (g/l) | CIE Whiteness |
|---|---|---|---|
| 0 | 0 | 0 | 104.6 |
| 0 | 8 | 0 | 104.7 |
| 0 | 0 | 8 | 104.8 |
| 2.0 | 0 | 0 | 119.2 |
| 2.0 | 8 | 0 | 122.5 |
| 2.0 | 0 | 8 | 121.5 |
| 4.0 | 0 | 0 | 127.2 |
| 4.0 | 8 | 0 | 131.1 |
| 4.0 | 0 | 8 | 127.9 |
| 6.0 | 0 | 0 | 131.1 |
| 6.0 | 8 | 0 | 135.4 |
| 6.0 | 0 | 8 | 131.6 |
| 8.0 | 0 | 0 | 133.7 |
| 8.0 | 8 | 0 | 138.1 |
| 8.0 | 0 | 8 | 133.5 |
| 10.0 | 0 | 0 | 136.0 |
| 10.0 | 8 | 0 | 139.7 |
| 10.0 | 0 | 8 | 134.7 |

Example 3

Sizing compositions are prepared by adding an optical brightener of formula (22) in such an amount, that a range of final concentrations of from 0 to 12.5 g/l of optical brightener is achieved, to a stirred, aqueous solutions of magnesium chloride (final concentrations are 6.25 and 12.5 g/l) and an anionic oxidized corn starch (final concentration 50 g/l) (Penford Starch 260) at 60° C. Each sizing solution is allowed to cool, then poured between the moving rollers of a laboratory size-press and applied to a commercial 75 g/m$^2$ AKD (alkyl ketene dimer) sized, bleached paper base sheet. The treated paper is dried for 5 minutes at 70° C. in a flat bed drier.

The dried paper is allowed to condition, and then measured for CIE whiteness on a calibrated Auto Elrepho spectrophotometer. The results are shown in Table 3.

Example 4

Sizing compositions are prepared by adding an optical brightener of formula (22) in such an amount, that a range of final concentrations of from 0 to 12.5 g/l of optical brightener is achieved, to a stirred, aqueous solutions of magnesium thiosulphate hexahydrate (final concentrations are 10 and 20 g/l) and an anionic oxidized corn starch (final concentration 50 g/l) (Penford Starch 260) at 60° C. The sizing solution is allowed to cool, then poured between the moving rollers of a laboratory size-press and applied to a commercial 75 g/m$^2$ AKD (alkyl ketene dimer) sized, bleached paper base sheet. The treated paper is dried for 5 minutes at 70° C. in a flat bed drier.

The dried paper is allowed to condition, and then measured for CIE whiteness on a calibrated Auto Elrepho spectrophotometer. The results are shown in Table 3.

TABLE 3

| | CIE Whiteness | | | | |
|---|---|---|---|---|---|
| | | Magnesium salt added | | | |
| Compound of formula | no Mg salt, i.e. Na salt | Magnesium chloride (g/l) (example 3) | | Magnesium thiosulphate hexahydrate (g/l) (example 4) | |
| (22) (g/l) | only | 6.25 | 12.5 | 10.0 | 20.0 |
| 0 | 102.8 | 102.9 | 103.5 | 102.2 | 102.7 |
| 2.5 | 119.6 | 122.4 | 125.5 | 125.1 | 123.6 |
| 5.0 | 128.9 | 131.1 | 132.5 | 132.9 | 132.7 |
| 7.5 | 135.1 | 136.3 | 137.9 | 137.7 | 137.9 |
| 10.0 | 139.2 | 140.9 | 141.4 | 141.1 | 141.0 |
| 12.5 | 141.1 | 142.3 | 142.8 | 142.4 | 142.4 |

The results clearly demonstrate the advantage of using magnesium chloride or magnesium thiosulphate to reach higher whiteness levels in comparison to where optical brightener is present only as the sodium salt.

Example 5

115.6 parts of aniline-2,5-disulphonic acid monosodium salt are added to 74.5 parts of cyanuric chloride in 400 parts of ice and 300 parts of water. The pH of the reaction is maintained at approx. 4 to 5 by dropwise addition of an approx. 30% aqueous NaOH solution while keeping the temperature below 10° C. by using an external ice/water bath. After completion of the reaction, the temperature is gradually increased to 30° C. using an external heating system and 74.1 parts of 4,4'-diaminostilbene-2,2'-disulphonic acid are added. The resulting mixture is heated to 50 to 60° C. while maintaining the pH at approx. 5 to 7 by dropwise addition of an approx. 30% NaOH aqueous solution until completion of the reaction. 63.8 parts of aspartic acid are then added followed by 89.8 parts of magnesium hydroxide and the resulting slurry is heated to 90 to 95° C. until completion of the reaction. The temperature is gradually decreased to room temperature and insoluble materials are filtered off. The final concentration was adjusted to 0.125 mol of compound of formula (3) per kg of solution, for this purpose water was either added or removed by distillation. M in this case is composed of a mixture of sodium and magnesium cations.

Example 6

115.6 parts of aniline-2,5-disulphonic acid monosodium salt are added to 74.5 parts of cyanuric chloride in 400 parts of ice and 300 parts of water. 26.8 parts of magnesium hydroxide are added while keeping the temperature below 10° C. by using an external ice/water bath. After completion of the reaction, the temperature is gradually increased to 30° C. using an external heating system. 25.7 parts of magnesium hydroxide are added, followed by 74.1 parts of 4,4'-diaminostilbene-2,2'-disulphonic acid. The resulting mixture is heated to 50 to 60° C. until completion of the reaction. 63.8 parts of aspartic acid and 100 parts of water are then added followed by 89.8 parts of magnesium hydroxide and the resulting slurry is heated to 90 to 95° C. until completion of the reaction. The temperature is gradually decreased to room temperature and insoluble materials are filtered off. The final concentration was adjusted to 0.125 mol of compound of formula (3) per kg of solution using UV spectroscopy, for this purpose water was either added or removed by distillation. M in this case is composed of a mixture of sodium and magnesium cations.

Comparative Example 7

Comparative optical brightening solution 7 is prepared by dissolving compound of formula (22) in water with a final concentration of 0.125 mol/kg.

Example 8

Sizing compositions are prepared by adding an aqueous solution of an optical brightener, prepared according to example 5, in such an amount, that final concentrations of from 0 to 80 g/l of the aqueous solution of the optical brightener, prepared according to example 5, are achieved, to a stirred, aqueous solution of an anionic oxidized potato starch (Perfectamyl A4692 from AVEBE B.A.) (final concentration 50 g/l) at 60° C. Each sizing solution is allowed to cool, then poured between the moving rollers of a laboratory size-press and applied to a commercial 75 g/m$^2$ AKD (alkyl ketene dimer) sized, bleached paper base sheet. The treated paper is dried for 5 minutes at 70° C. in a flat bed drier.

The dried paper is allowed to condition, and then measured for CIE whiteness on a calibrated Auto Elrepho spectrophotometer. The results are shown in Table 4.

Example 9

Sizing compositions are prepared by adding an aqueous solution of an optical brightener prepared according to example 6, in such an amount, that final concentrations of from 0 to 80 g/l of the aqueous solution of the optical brightener, prepared according to example 6, are achieved, to a stirred, aqueous solution of an anionic oxidized potato starch (Perfectamyl A4692 from AVEBE B.A.) (final concentration 50 g/l) at 60° C. Each sizing solution is allowed to cool, then poured between the moving rollers of a laboratory size-press and applied to a commercial 75 g/m$^2$ AKD (alkyl ketene dimer) sized, bleached paper base sheet. The treated paper is dried for 5 minutes at 70° C. in a flat bed drier.

The dried paper is allowed to condition, and then measured for CIE whiteness on a calibrated Auto Elrepho spectrophotometer. The results are shown in Table 4.

Comparative Example 10

Sizing compositions are prepared by adding an aqueous solution of an optical brightener prepared according to example 7, in such an amount, that final concentrations of from 0 to 80 g/l of the aqueous solution of the optical brightener, prepared according to example 6, are achieved, to a stirred, aqueous solution of an anionic oxidized potato starch (Perfectamyl A4692 from AVEBE B.A.) (final concentration 50 g/l) at 60° C. Each sizing solution is allowed to cool, then poured between the moving rollers of a laboratory size-press and applied to a commercial 75 g/m$^2$ AKD (alkyl ketene dimer) sized, bleached paper base sheet. The treated paper is dried for 5 minutes at 70° C. in a flat bed drier.

The dried paper is allowed to condition, and then measured for CIE whiteness on a calibrated Auto Elrepho spectrophotometer. The results are shown in Table 4.

TABLE 4

| Concentration of the optical brightening solution (g/l) | CIE Whiteness example 8 | example 9 | Comparative application example 10 |
|---|---|---|---|
| 0 | 101.5 | 101.5 | 101.5 |
| 10 | 119.5 | 119.6 | 119.2 |
| 20 | 127.4 | 128.4 | 126.7 |
| 40 | 133.6 | 135.0 | 132.6 |
| 60 | 137.1 | 138.6 | 135.8 |
| 80 | 138.2 | 140.2 | 136.8 |

The results clearly demonstrate the advantage of using a mixed salt of an optical brightener comprising magnesium cation.

The invention claimed is:

1. A compound of formula (1), (1)

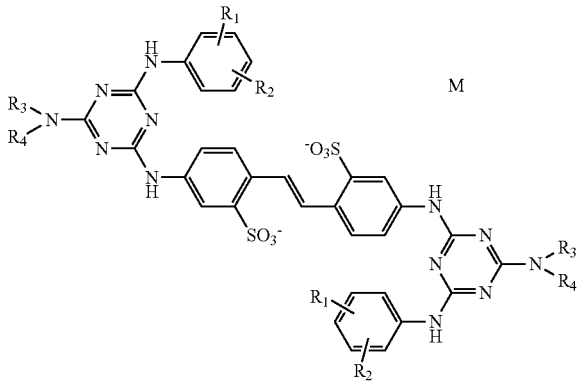

wherein $R_1$ is hydrogen or $SO_3^-$, $R_2$ is hydrogen or $SO_3^-$, $R_3$ is hydrogen, $C_{1-4}$ alkyl, $C_{2-3}$ hydroxyalkyl, $CH_2CO_2^-$, $CH_2CH_2CONH_2$ or $CH_2CH_2CN$, $R_4$ is $C_{1-4}$ alkyl, $C_{2-3}$ hydroxyalkyl, $CH_2CO_2^-$, $CH(CO_2^-)CH_2CO_2^-$ or $CH(CO_2^-)CH_2CH_2CO_2^-$, benzyl, or $R_3$ and $R_4$ together with the neighboring nitrogen atom signify a morpholine ring, [and]

wherein

M is the required stoichiometric cationic equivalent for balancing the anionic charge in formula (1) and is a combination of $Mg^{2+}$ together with at least 1 further cation selected from the group consisting of $H^+$, alkali metal cation, alkaline earth metal cation other than $Mg^{2+}$, ammonium, mono-$C_1$-$C_4$-alkyl-di-$C_2$-$C_3$-hydroxyalkyl ammonium, di-$C_1$-$C_4$-alkyl-mono-$C_2$-$C_3$-hydroxyalkyl ammonium, ammonium which is mono-, di- or trisubstituted by a $C_2$-$C_3$ hydroxyalkyl radical and mixtures thereof, *and*

*wherein the molar ratio of the $Mg^{2+}$ to the further cation in M is between 50:50 and 99.99:0.01.*

2. The compound of formula (1) as claimed in claim 1, wherein $R_3$ is hydrogen, methyl, ethyl, n-propyl, iso-propyl, β-hydroxyethyl, β-hydroxypropyl, $CH_2CO_2^-$, $CH_2CH_2CONH_2$ or $CH_2CH_2CN$;

$R_4$ is methyl, ethyl, n-propyl, isopropyl, 2-butyl, β-hydroxyethyl, β-hydroxypropyl, $CH_2CO_2^-$, $CH(CO_2^-)CH_2CO_2^-$, $CH(CO_2^-)CH_2CH_2CO_2^-$, or benzyl.

3. The compound as claimed in claim 1, wherein M is the required stoichiometric cationic equivalent for balancing the anionic charge in formula (1) and is a combination of $Mg^{2+}$ together with 1, 2, 3, 4, 5 or 6 further cations.

4. A compound as claimed in claim 1, wherein M is the required stoichiometric cationic equivalent for balancing the anionic charge in formula (1) and is a combination of $Mg^{2+}$ together with 1, 2 or 3 further cations.

5. A compound as claimed in claim 1, wherein M is the required stoichiometric cationic equivalent for balancing the anionic charge in formula (1) and is a combination of $Mg^{2+}$ together with 1 or 2 further cations.

6. A compound as claimed in claim 1, wherein the ratio of M to the rest of formula (1) is between 6.25:12.5 and 50:2.

7. A compound as claimed in claim 1, wherein the ratio of M to the rest of formula (1) is between 8:12.5 and 8:2.5.

8. The compound of formula (1) as claimed in claim 1, wherein $R_1$ is hydrogen or $SO_3^-$, $R_2$ is hydrogen or $SO_3^-$, $R_3$ is hydrogen, $CH_2CO_2^-$, $CH_2CH_2CONH_2$ or $CH_2CH_2CN$, $R_4$ is $C_{2-3}$ hydroxyalkyl, $CH_2CO_2^-$, $CH(CO_2)CH_2CO_2^-$ or $CH(CO_2^-)CH_2CH_2CO_2^-$, excepting that $R_4$ cannot be $C_{2-3}$ hydroxyalkyl if $R_3$ is hydrogen, or $R_3$ and $R_4$ together with the neighboring nitrogen atom signify a morpholine ring, and wherein M is the required stoichiometric cationic equivalent for balancing the anionic charge in formula (1) and is a combination of $Mg^{2+}$ together with at least 1 further cation selected from the group consisting of $H^+$, alkali metal cation, alkaline earth metal cation other than $Mg^{2+}$, ammonium, mono-$C_1$-$C_4$-alkyl-di-$C_2$-$C_3$-hydroxyalkyl ammonium, di-$C_1$-$C_4$-alkyl-mono-$C_2$-$C_3$-hydroxyalkyl ammonium, ammonium which is mono-, di- or trisubstituted by a $C_2$-$C_3$ hydroxyalkyl radical and mixtures thereof.

9. The compound of formula (1) as claimed in claim 1, wherein $R_3$ is hydrogen, $CH_2CO_2^-$, $CH_2CH_2CONH_2$ or $CH_2CH_2CN$;

$R_4$ is β-hydroxyethyl, β-hydroxypropyl, $CH_2CO_2^-$, $CH(CO_2^-)CH_2CO_2^-$, or $CH(CO_2^-)CH_2CH_2CO_2^-$, excepting that $R_4$ cannot be $C_{2-3}$ hydroxyalkyl if $R_3$ is hydrogen.

[10. The compound of formula (I) as claimed in claim 1, wherein the molar ratio of $Mg^{2+}$ to the at least one further cation in M is between 20:80 and 99.99:0.01.]

11. The compound of formula (I) as claimed in claim 1, wherein the at least one further cation in M is selected from the group consisting of $H^+$, $Li^+$, $Na^+$, $K^+$, $Ca^{2+}$, N-methyl-N,N-diethanolammonium, N,N-dimethyl-N-ethanolammonium, triethanolammonium, tri-isopropanolammonium, and mixtures thereof.

12. The compound of formula (I) as claimed in claim 1, wherein the at least one further cation comprises $Na^+$.

13. A sizing composition comprising a compound as claimed in claim 1.

14. Brightened paper brightened by a sizing composition, wherein the sizing composition comprises the compound of formula (1) as defined in claim 1.

15. A process for optical brightening of paper comprising the steps of a) applying a sizing composition comprising the compound of formula (1) as defined in claim 1 to the paper to form treated paper, b) drying the treated paper.

16. A process for the preparation of a compound of formula (1)

(1)

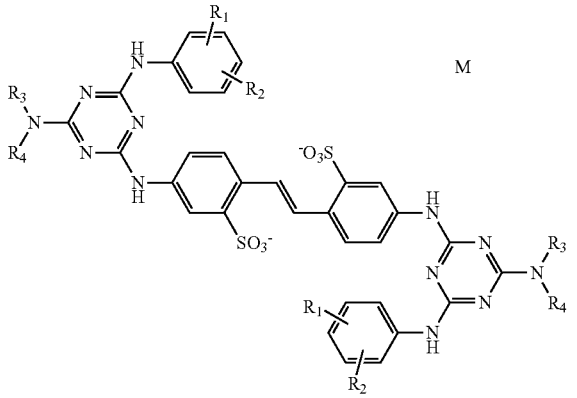

M wherein $R_1$ is hydrogen or $SO_3^-$, $R_2$ is hydrogen or $SO_3^-$, $R_3$ is hydrogen, $C_{1-4}$ alkyl, $C_{2-3}$ hydroxyalkyl, $CH_2CO_2^-$, $CH_2CH_2CONH_2$ or $CH_2CH_2CN$, $R_4$ is $C_{1-4}$ alkyl, $C_{2-3}$ hydroxyalkyl, $CH_2CO_2^-$, $CH(CO_2^-)CH_2CO_2^-$ or $CH(CO_2^-)CH_2CH_2$, $CO_2^-$, benzyl, or $R_3$ and $R_4$ together with the neighboring nitrogen atom signify a morpholine ring, and wherein M is the required stoichiometric cationic equivalent for balancing the anionic charge in formula (1) and is a combination of $Mg^{2+}$ together with at least 1 further cation selected from the group consisting of $H^+$, alkali metal cation, alkaline earth metal cation other than $Mg^{2+}$, ammonium, mono-$C_1$-$C_4$-alkyl-di-$C_2$-$C_3$-hydroxyalkyl ammonium, di-$C_1$-$C_4$-alkyl-mono-$C_2$-$C_3$-hydroxyalkyl ammonium, ammonium which is mono-, di- or trisubstituted by a $C_2$-$C_3$ hydroxyalkyl radical and mixtures thereof, comprising the steps of having a reaction A, followed by a reaction B, followed by a reaction C, wherein in reaction A a compound of formula (10) is reacted with a compound of formula (II) to form a compound of formula (12);

(11)

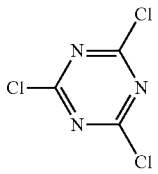

-continued (10)

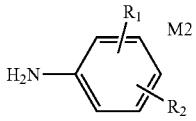

M2

(12)

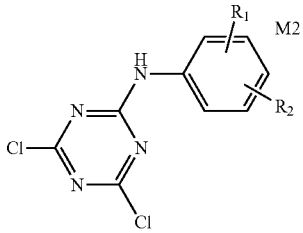

M2 in reaction B a compound of formula (12) is reacted with a compound of formula (13) to form a compound of formula (14);

(13)

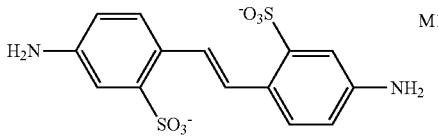

M1

(14)

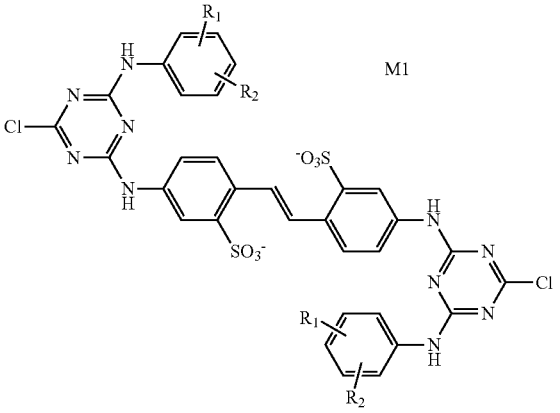

M1 and in reaction C the compound of formula (14) is reacted with a compound of formula (15) to form the compound of formula (1);

(15)

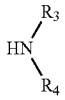

with $R_1$, $R_2$, $R_3$ and $R_4$ being as defined above;

M1 is identical or different in formula (13) and (14) and is the required stoichiometric cationic equivalent for balancing the anionic charge in these formulae and is at least 1 cation selected from the group consisting of $H^+$, alkali metal cation, alkaline earth metal cation other than magnesium, ammonium, mono-$C_1$-$C_4$-alkyl-di-$C_2$-$C_3$-hydroxyalkyl ammonium, di-$C_1$-$C_4$-alkyl-mono-$C_2$-$C_3$-hydroxyalkyl ammonium, ammonium which is mono-, di- or trisubstituted by a $C_2$-$C_3$ hydroxyalkyl radical and mixtures thereof, M2 is independently from each other identical or different in formula (10) and (12) and is the required stoichiometric cationic equivalent for balancing the anionic charge in these formulae in the case that either $R_1$ or $R_2$ or both $R_1$ and $R_2$ are $SO_3^-$, and has the same definition as M1, with the proviso, that at least 1 of the reactions A, B or C is carried out in the presence of the cation CAT, with the cation CAT being $Mg^{2+}$.

17. A process for the preparation of compound of formula (1)

(1)

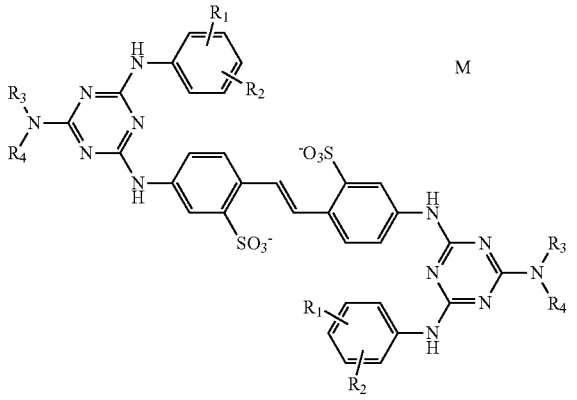

M wherein $R_1$ is hydrogen or $SO_3^-$, $R_2$ is hydrogen or $SO_3^-$, $R_3$ is hydrogen, $C_{1-4}$, alkyl, $C_{2-3}$ hydroxyalkyl, $CH_2CO_2^-$, $CH_2CH_2CONH_2$ or $CH_2CH_2CN$, $R_4$ is $C_{1-4}$ alkyl, $C_{2-3}$ hydroxyalkyl, $CH_2CO_2^-$, $CH(CO_2^-)CH_2CO_2^-$ or $CH(CO_2^-)CH_2CO_2^-$, benzyl, or $R_3$ and $R_4$ together with the neighboring nitrogen atom signify a morpholine ring, and wherein M is the required stoichiometric cationic equivalent for balancing the anionic charge in formula (1) and is combination of $Mg^{2+}$ together with at least 1 further cation selected from the group consisting of $H^+$, alkali metal cation, alkaline earth metal cation other than $Mg^{2+}$, ammonium, mono-$C_1$-$C_4$-alkyl-di-$C_2$-$C_3$-hydroxyalkyl ammonium, di-$C_1$-$C_4$-alkyl-mono-$C_2$-$C_3$-hydroxyalkyl ammonium, ammonium which is mono-, di- or trisubstituted by a $C_2$-$C_3$ hydroxyalkyl radical and mixtures thereof, comprising the step of mixing a compound of formula (20) with a component b), wherein component b) is a magnesium salt MS2, in aqueous medium;

(20)

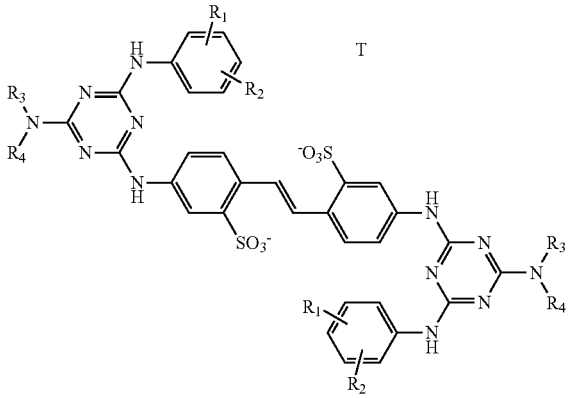

T wherein $R_1$, $R_2$, $R_3$ and $R_4$ have the definition above;

and wherein

T balances the anionic charge and is the required stoichiometric equivalent of a cation selected from the group consisting of $H^+$, alkali metal cation, ammonium, mono-$C_1$-$C_4$-alkyl-di-$C_2$-$C_3$-hydroxyalkyl ammonium, di-$C_1$-$C_4$-alkyl-mono-$C_2$-$C_3$-hydroxyalkyl ammonium, ammonium which is mono-, di- or trisubstituted by a $C_2$-$C_3$ hydroxyalkyl radical and mixtures thereof.

18. The process as defined in claim 17 for the preparation of compound of formula (1), wherein the magnesium salt MS2 is selected from the group consisting of magnesium acetate, magnesium bromide, magnesium chloride, magnesium formate, magnesium iodide, magnesium nitrate, magnesium sulphate and magnesium thiosulphate.

19. The process as defined in claim 17 for the preparation of compound of formula (1), wherein the mixing is done in aqueous solution.

* * * * *